US009834944B2

(12) United States Patent
Maurer et al.

(10) Patent No.: US 9,834,944 B2
(45) Date of Patent: Dec. 5, 2017

(54) LIFT FOR HIGH-VOLTAGE TOWERS AND WIND TURBINE TOWERS

(75) Inventors: Andreas Maurer, Zurich (CH); Pascal Mosetti, Niederlenz (CH)

(73) Assignee: HIGHSTEP SYSTEMS AG, Dietikon (CH)

( * ) Notice: Subject to any disclaimer, the term of this patent is extended or adjusted under 35 U.S.C. 154(b) by 0 days.

(21) Appl. No.: 14/003,870

(22) PCT Filed: Mar. 2, 2012

(86) PCT No.: PCT/EP2012/053595
§ 371 (c)(1),
(2), (4) Date: Sep. 9, 2013

(87) PCT Pub. No.: WO2012/119932
PCT Pub. Date: Sep. 13, 2012

(65) Prior Publication Data
US 2013/0341122 A1 Dec. 26, 2013

(30) Foreign Application Priority Data
Mar. 9, 2011 (CH) .......................... 402/11

(51) Int. Cl.
*E04G 3/28* (2006.01)
*B66B 9/02* (2006.01)
(Continued)

(52) U.S. Cl.
CPC ............... *E04G 3/28* (2013.01); *B66B 9/022* (2013.01); *B66B 9/187* (2013.01); *E04G 3/243* (2013.01); *Y02B 10/30* (2013.01)

(58) Field of Classification Search
CPC .......... E04G 3/28; E04G 3/243; B66B 9/022; B66B 9/187; Y02B 10/30; B66F 11/04
(Continued)

(56) References Cited

U.S. PATENT DOCUMENTS 1,667,440 A * 4/1928 Scannell ...................... 182/145
3,752,263 A * 8/1973 Thevenot ..................... 182/148
(Continued)

FOREIGN PATENT DOCUMENTS

CA 2602739 C * 4/2016 ............ B66B 9/187
DE 102 01 965 A1 7/2003
(Continued)

OTHER PUBLICATIONS

Notification of Transmittal of Translation of the International Preliminary Report on Patentability and Written Opinion dated Sep. 19, 2013; International Application No. PCT/EP2012/053595; International Filing Date: Mar. 2, 2012, and English translation of the International Preliminary Report on Patentability and the Written Opinion, 12 pages.
(Continued)

*Primary Examiner* — Katherine Mitchell
*Assistant Examiner* — Marcus Menezes
(74) *Attorney, Agent, or Firm* — Oliff PLC

(57) ABSTRACT

An arrangement for overcoming heights or vertical distances, such as, in particular, high-voltage towers, towers for wind installations, buildings, high-bay warehouses, etc., has a longitudinally extended, rail-like profile (7) or guide member, and at least one portable lift element which is releasably fastenable to the profile, consisting of a driving part (3) which is movable up and down along the profile or guide member and a platform (5) for receiving at least one person or loads.

13 Claims, 12 Drawing Sheets

(51) Int. Cl.
*B66B 9/187* (2006.01)
*E04G 3/24* (2006.01)

(58) Field of Classification Search
USPC ........................................................ 182/145
See application file for complete search history.

(56) References Cited

U.S. PATENT DOCUMENTS

| | | | | |
|---|---|---|---|---|
| 3,968,858 | A | | 7/1976 | Vollan et al. |
| 4,294,332 | A | * | 10/1981 | Ready ............................ 182/141 |
| 4,310,070 | A | | 1/1982 | Mastrogiannis |
| 4,753,321 | A | * | 6/1988 | Winslow .................. E04G 1/20 |
| | | | | 182/145 |
| 4,828,072 | A | | 5/1989 | Ho |
| 4,862,997 | A | * | 9/1989 | Eberle ........................... 182/148 |
| 4,979,588 | A | * | 12/1990 | Pike et al. ....................... 182/18 |
| 5,143,181 | A | * | 9/1992 | Bixby ............................ 187/242 |
| 5,271,482 | A | * | 12/1993 | Walz ............................ 182/69.6 |
| 5,351,783 | A | * | 10/1994 | Celli ...................... A63B 27/00 |
| | | | | 182/133 |
| 5,487,446 | A | * | 1/1996 | Patnode et al. ................ 182/148 |
| 5,579,865 | A | * | 12/1996 | Butler ...................... B66B 9/02 |
| | | | | 182/141 |
| 5,636,705 | A | * | 6/1997 | St-Germain ............ B66F 11/04 |
| | | | | 182/141 |
| 6,640,934 | B1 | * | 11/2003 | Edwards ........................ 187/239 |
| 7,004,288 | B2 | * | 2/2006 | Araki ........................ E06C 7/12 |
| | | | | 182/103 |
| 7,096,996 | B2 | * | 8/2006 | Korchagin .............. B66B 9/187 |
| | | | | 182/37 |
| 7,281,607 | B1 | * | 10/2007 | Kiraly ............................ 182/82 |
| 7,909,139 | B2 | * | 3/2011 | Blue ....................... A01M 31/02 |
| | | | | 182/103 |
| 7,975,807 | B2 | * | 7/2011 | Franklin .................. B66B 9/027 |
| | | | | 182/144 |
| 8,079,444 | B1 | * | 12/2011 | Rands ..................... B66B 9/187 |
| | | | | 182/133 |
| 8,316,994 | B1 | * | 11/2012 | Rands ..................... B66B 9/187 |
| | | | | 182/141 |
| 8,325,053 | B2 | * | 12/2012 | Flynt ....................... G08B 19/00 |
| | | | | 182/231 |
| 2002/0171247 | A1 | | 11/2002 | Willis et al. |
| 2006/0070817 | A1 | * | 4/2006 | Campbell et al. ............. 187/238 |
| 2006/0249985 | A1 | * | 11/2006 | Leske ....................... 296/190.03 |
| 2007/0125599 | A1 | * | 6/2007 | Campbell ................ B66F 11/04 |
| | | | | 182/148 |
| 2008/0230312 | A1 | * | 9/2008 | Van Havermaet ........... 182/63.1 |
| 2010/0231402 | A1 | * | 9/2010 | Flynt .................. A62B 35/0025 |
| | | | | 340/679 |
| 2010/0252645 | A1 | | 10/2010 | Maurer et al. |
| 2012/0018253 | A1 | * | 1/2012 | Taberah .................. B66B 9/187 |
| | | | | 182/141 |
| 2013/0206505 | A1 | * | 8/2013 | Tremblay .................. A62B 1/02 |
| | | | | 182/18 |

FOREIGN PATENT DOCUMENTS

| | | | | |
|---|---|---|---|---|
| FR | 2675196 | A1 | | 10/1992 |
| FR | 2893057 | A1 | * | 5/2007 ........... E04D 15/006 |
| JP | H08-12219 | A | | 1/1996 |
| JP | H10-203790 | A | | 8/1998 |
| JP | H10-338480 | A | | 12/1998 |
| JP | 2009-107746 | A | | 5/2009 |
| JP | 2010-538937 | A | | 12/2010 |
| TW | GB 2496228 | B | * | 11/2013 ................ A47L 1/02 |
| WO | WO 2005/016461 | A1 | | 2/2005 |
| WO | WO 2007/051341 | A1 | | 5/2007 |
| WO | 2009/034010 | A2 | | 3/2009 |

OTHER PUBLICATIONS

International Search Report and Written Opinion dated Aug. 9, 2012; International Application No. PCT/EP2012/053595; International Filing Date: Mar. 2, 2012.

* cited by examiner

1. FIT MAIN DEVICE TO THE RAIL
3. LOCK PIVOTING ROLLERS
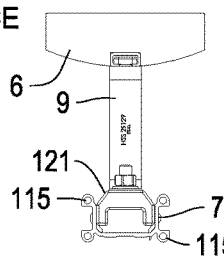
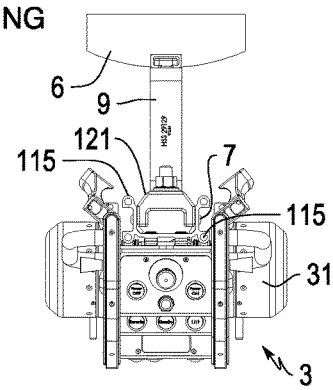
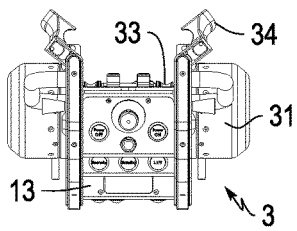
FIG. 7a
FIG. 7b
7. ATTACH AND LOCK PLATFORM
5. READY FOR USE
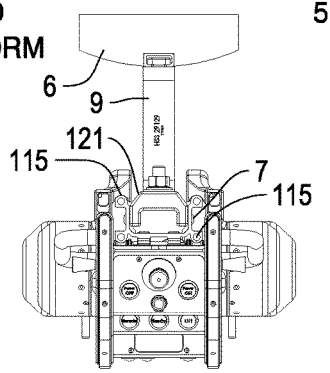
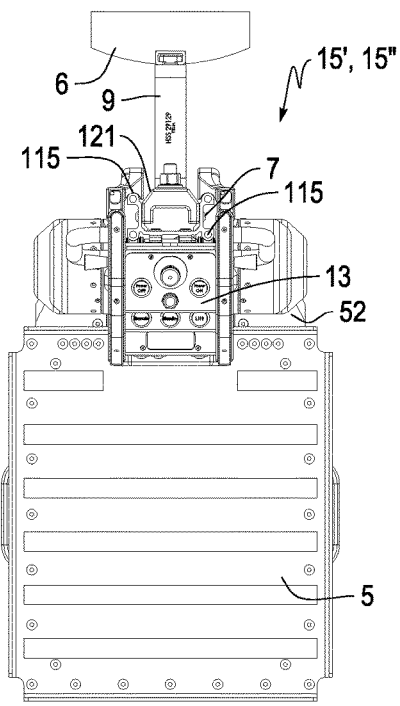
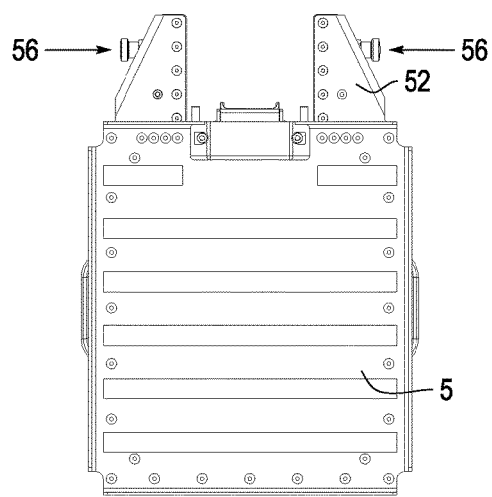
FIG. 7c
FIG. 7d

TRANSPORTABLE OR PORTABLE UNITS

LIFT AS A WHOLE

CLIP-ON WHEELS FOR EVEN SIMPLER TRANSPORT

LIFT FOR HIGH-VOLTAGE TOWERS AND WIND TURBINE TOWERS

RELATED APPLICATIONS

This application is a U.S. national phase application under 35 U.S.C. §371 of International Application Number PCT/EP2012/053595 filed Mar. 2, 2012 with claiming priority of Switzerland Application Number 00402/11 filed Mar. 9, 2011.

TECHNICAL FIELD

The present invention relates to an arrangement for climbing, for example, high-voltage and wind-turbine towers where at least extensive vertical distances must be overcome and to a method for climbing an, for example, high-voltage or wind-turbine tower.

BACKGROUND

Increased safety requirements are in force for maintenance and repair work on high towers, such as, for example, high-voltage power line towers, towers for wind installations and the like, and therefore complicated and expensive lift or ladder systems have to be arranged in or on said towers. However, it is hazardous to climb up and down ladders, and an investigation by Darmstadt Technical College, for example, revealed that approx. 70% of the accidents have taken place in conjunction with the climbing of ladders which are fixedly fitted, such as, for example, on the high-voltage towers mentioned.

The prior art describes a series of what are referred to as climbing aids which are proposed in order to climb high objects. For example, DE 102 01 965 describes a device for covering distances directed vertically upward. This describes a climbing aid which is actuable by means of muscular power and is movable up and down in the manner of a caterpillar on a ladder attached in a fixed position. Further climbing aids are described, for example, in U.S. Pat. No. 3,968,858, U.S. Pat. No. 4,310,070 and in WO2007/051 341.

Furthermore, U.S. Pat. No. 4,828,072 describes a rescue device, such as a rescue ladder or a rescue lift which can be moved up and down on a sliding surface designed in the manner of a rack on a house façade. In this case, the person who is to be rescued is held on the slider or lift by means of a strap system, wherein, furthermore, automatically responding braking systems are provided in order to permit safe rescue of a person. For the 500 000 high-voltage towers erected in Germany alone, a system of this type is not suitable, since it is too complicated, too expensive and also too awkward in operation.

Finally, WO 2005/016 461 describes an arrangement for climbing up and/or down, for example, high-voltage towers, wherein the climbing primarily takes place by means of two separate climbing consoles which can be used both manually and also by means of a motor drive. According to one variant embodiment, it is even proposed to operate the two climbing consoles coupled together as a lift.

All of the known systems have the disadvantage that, because of the exacting safety requirements, climbing, for example, of the high-voltage towers mentioned is very time-consuming and laborious, and the systems are too expensive in particular in respect of the anticipated costs, especially during operation.

A further disadvantage resides in the fact that the climbing devices or lifts are heavy in terms of weight, and therefore use on different towers necessitates laborious transportation from one tower to the next, for example with a transport vehicle.

SUMMARY

It is therefore an object of the present invention to propose a device which is cost-effective, is simple to install and is also simple to use and permits rapid, safe and uncomplicated climbing in particular of the high-voltage towers mentioned.

A further object consists in proposing a climbing device which is autonomous of, for example, climbing profiles arranged on the tower, is usable on different towers and is mobile and is easily transportable.

An arrangement is proposed for climbing towers, such as, in particular, high-voltage towers, towers of wind installations, such as for wind turbines, high buildings, high-bay warehouses, etc., which arrangement has a longitudinally extended, rail-like profile or guide member, and also at least one portable, mobile lift element which is fastenable re-releasably to the profile or guide member, consists of a driving part which is movable up and down along the profile or guide member and of a platform for receiving at least one person or loads, wherein the drive of the driving part is feedable by an energy accumulator arranged in the lift element or by an external power source, such as a storage battery, a battery or via a power transmission member.

The storage battery or the battery can be arranged in the lift element, preferably in the platform, so as to be removable again.

According to one alternative embodiment, it is proposed that the platform is connected to the driving part so as to be removable again.

In turn according to one alternative embodiment, it is proposed that the lift element is partially composed of lightweight construction materials, such as fiber-reinforced composite materials, aluminum, aluminum alloys and/or the like, in order to guarantee the portability as a whole or in parts.

According to a further alternative embodiment, it is proposed that the rail-like profile is of U-shaped design, V-shaped design or is designed extensively rectilinearly in the form of a band, and the driving part has securing members which engage laterally around the profile, as seen in the longitudinal direction, and are latchable in a fixing position in order to ensure secure holding of the driving part on the profile.

Furthermore, it is proposed that at least one gearwheel is provided on the driving part for the transmission of force from the drive to the profile which has perforations or openings which run in the longitudinal direction and are in the manner of a rack.

Furthermore, it is proposed that at least one emergency stopping member which is latchable into the rack is provided on the driving part, said emergency stopping member being operatively connected to a position, motion and/or speed sensor.

In turn according to a further alternative embodiment, it is proposed that the rail-like profile consists of at least two or more joinable or pluggable-together profile elements, having a rack division running in the longitudinal direction. Longitudinally running pattern elements are arranged in at least one wall of each profile element, with a uniformly spaced pattern of holes corresponding to the rack division. A connecting element is provided between every two profile elements, with a further wall provided in order to bear against the wall of each profile element and with further patterns of holes which likewise run longitudinally and are congruent to the pattern of the holes, said patterns of holes therefore being spaced in a corresponding manner. Profile elements and the connecting element are fixedly connected to one another by means of rivets, pins, screws and the like, which are arranged in the perforations of the patterns of holes, in such a manner that the rack division merges in an unchanging manner from one profile element to the other.

Instead of the longitudinally extended profile, the lift element can be moved upward and downward on a guide member, such as a pillar, one or more rod elements or one or more wire cables.

In turn, it is furthermore proposed that the securing members, such as, for example, sliding rollers, are automatically lockable or foldable inward, in each case engaging laterally behind the profile or guide member, when the driving part is placed against the profile or guide member.

Further alternative embodiments of the arrangement according to the invention are characterized in dependent claims.

A method for climbing towers, such as, in particular, high-voltage towers, towers for wind installations and the like, is furthermore proposed, wherein, on a longitudinally extended, rail-like profile or guide member fastened to the tower, a lift element, which is autonomous of the profile or guide member and is removable again, is arranged on the profile, which lift element is arranged fixedly on the profile by means of latchable securing members engaging laterally in each case behind the profile or guide member. A platform which is connected re-releasably to the driving part is accessed by at least one person, or is loaded with a load, and the driving part is fed/activated by an energy accumulator, such as a storage battery or a battery or by an external power source, in order to move upward on the tower by way of the profile, wherein the energy accumulator is optionally arranged in the lift element.

Alternative embodiments of the method according to the invention are characterized in dependent claims.

BRIEF DESCRIPTION OF THE DRAWINGS

The invention is now explained in more detail by way of example and with reference to the attached figures, in which:

FIG. 7 shows schematically, with reference to figures a to d, the fixed arrangement of the lift element on the rail-like profile.

DETAILED DESCRIPTION

Figure 1A:
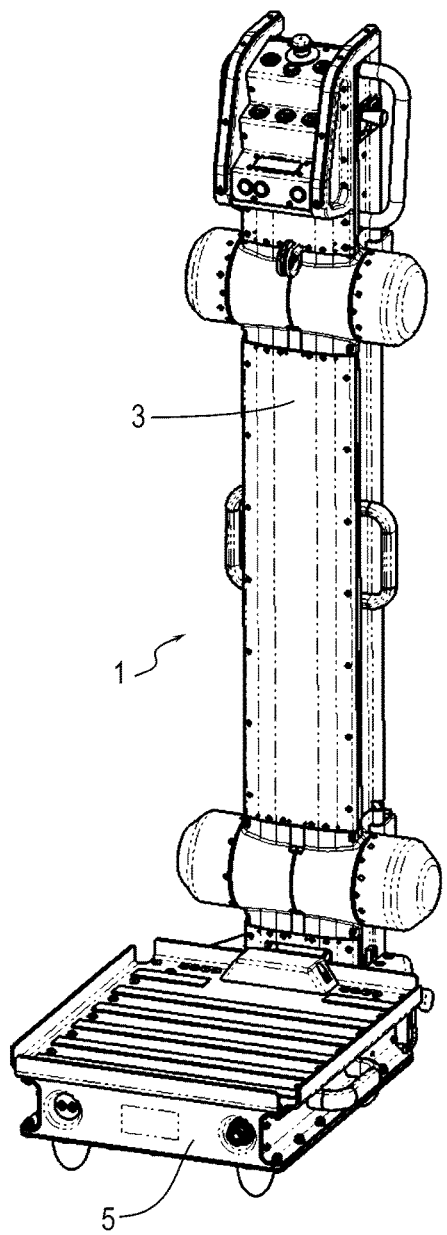
FIGS. 1*a* and 1*b* show the lift element according to the invention in two different perspective views.
Figure 1B:
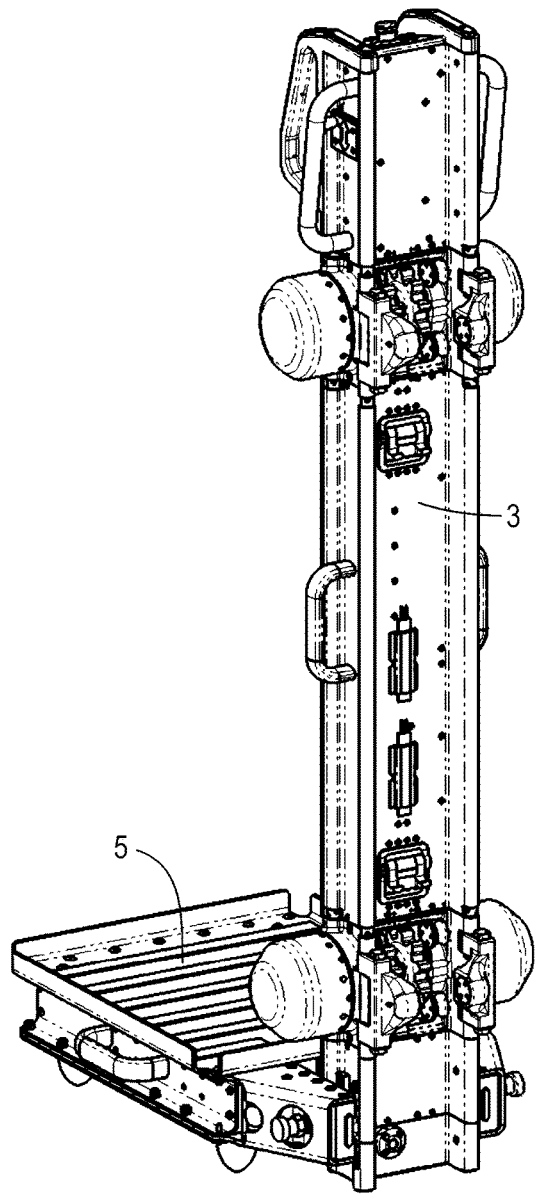

FIG. 1 shows, in perspective, two different views of the lift element 1 according to the invention which is provided in order to serve, for example, for the ascent and descent of a person when carrying out repair work to high-voltage towers. The lift element 1 according to the invention primarily has two main parts, namely a driving and guide part 3 and a platform 5, provided in order to serve as a base for a person or a load.

Figure 2A:
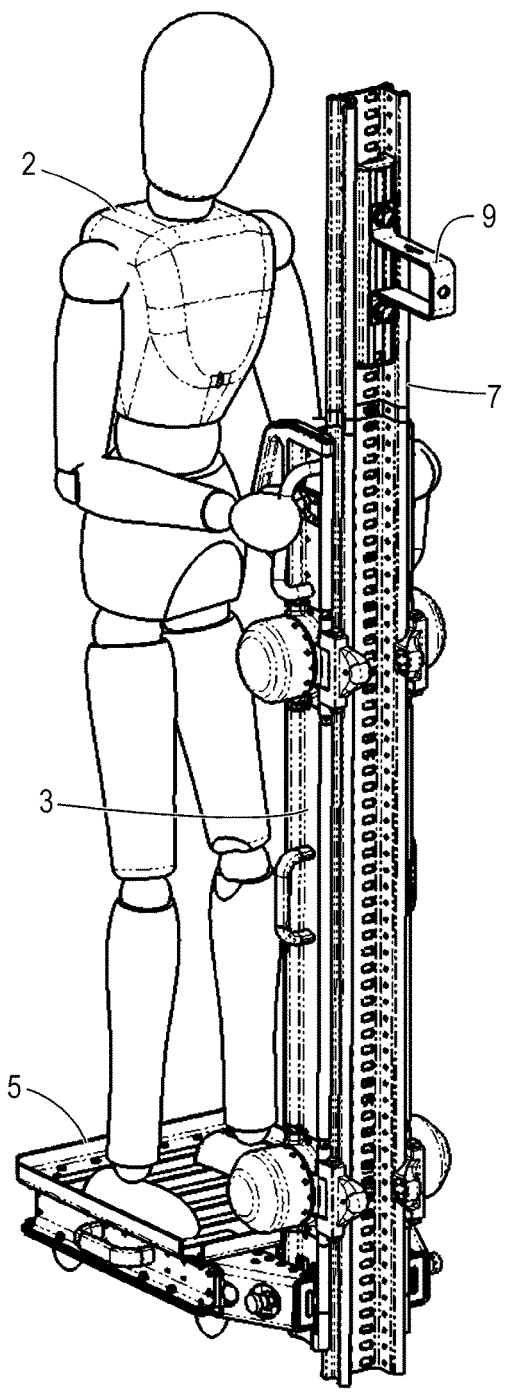
FIG. 2 shows the lift element according to the invention in figures a and b, likewise in a perspective view, and arranged on the longitudinally extended, rail-like profile together with an operator.
Figure 2B:
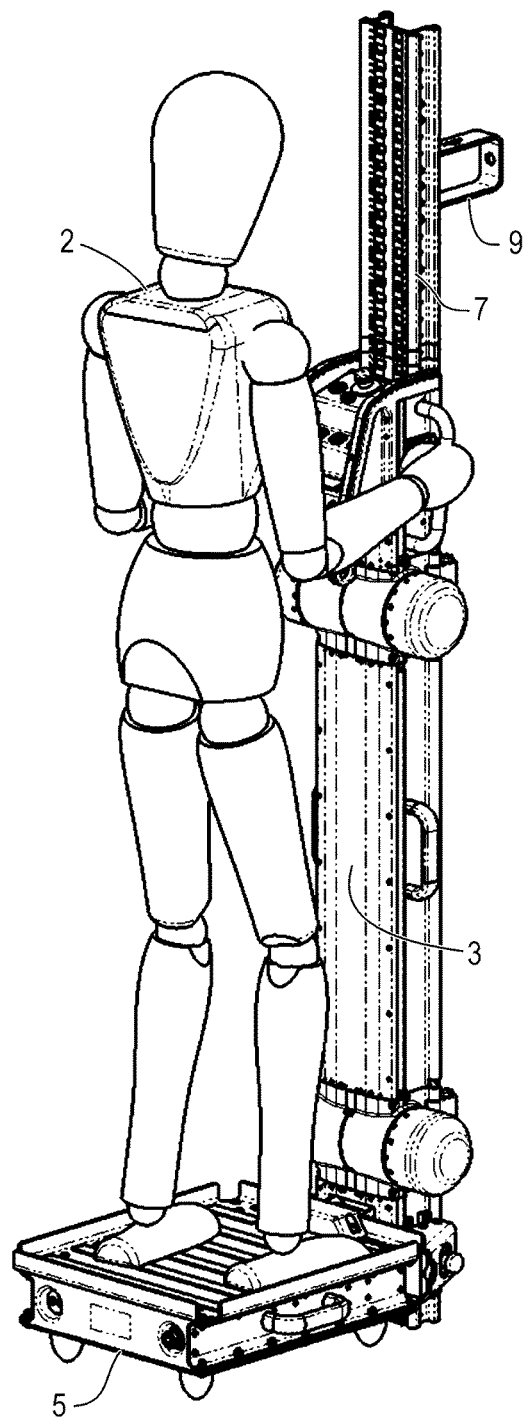

FIG. 2, in turn in two perspective views, illustrates the lift element 1 mounted on the longitudinally extended, rail-like profile 7. The driving part 3 is fixedly connected to the profile 7, wherein the manner of the fastening will be discussed later on. A person 2 who has to climb up, for example, for carrying out repair or installation work on a high-voltage tower is located on the platform 5 which is connected to the driving part 3. Finally, a fastening element or a fastening clamp 9 is provided on the profile 7, by means of which the profile or guide member is fixedly arranged on the tower. Of course, instead of a platform, a seat can also be provided for the person.

Figure 3:
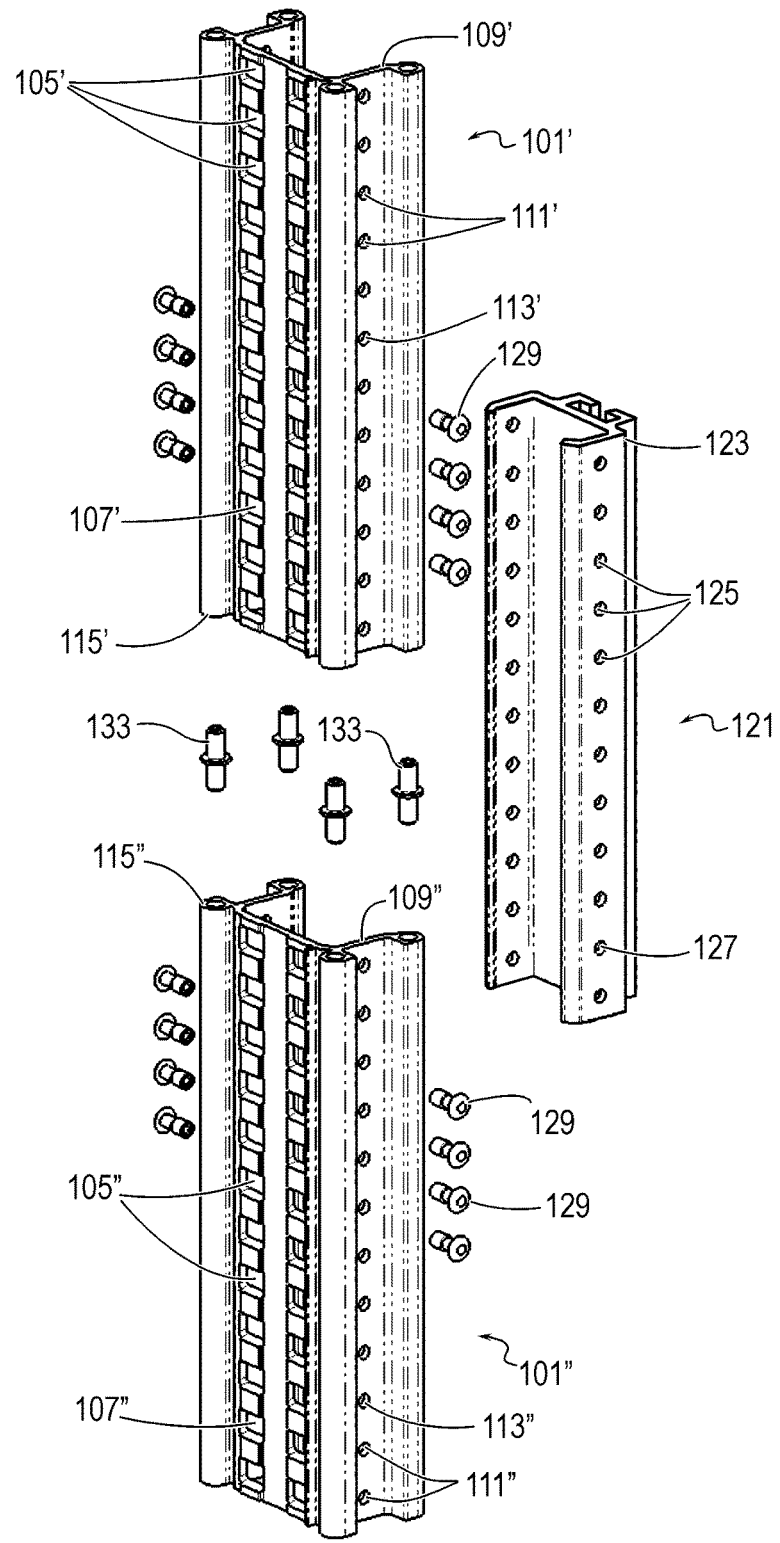
FIG. 3 shows, in a schematic perspective, two rail-like profiles which are to be connected and a connecting element provided for the connection.

FIG. 3, in turn schematically and in perspective, illustrates how two profile elements are connected to each other in order to produce the entire rail-like profile along the high-voltage tower for the ascent or descent of the lift element and, for example, of the person who has to use the lift for carrying out repair work. The two profile elements 101' and 101" illustrated in FIG. 3 have a U-shaped cross section with longitudinal tubes 115' and 115" arranged in the corners of the U-shaped profile. As can clearly be seen in FIG. 3, the profile elements 101' and 101" have a longitudinally running rack division 105' and 105" which is provided so that the driving part can be moved upward and downward along the profile by means of gearwheels engaging in the rack division. For the joining together of the two profile elements 101' and 101", it is now essential for the rack division 105' and 105" to be continued from one profile to the next in a consistently spaced manner. For this reason, the use of at least one connecting element 121 is proposed in order to guarantee the consistent spacing of rack division 105' and 105". The two profile elements have patterns of holes 111' and 111" which run longitindally in two lateral limb surfaces 109' and 109" and have individual perforations 113' and 113". Patterns of holes 125 which likewise each run in the longitudinal direction and have individual perforations 127 are provided in the two side limbs 123 of the connecting element 121 which is likewise formed in a U-shaped manner mirror-symmetrically with respect to the two profiles. The individual perforations 127 have an at least approximately identical hole cross section as the perforations 113' and 113" and, in addition, are spaced identically. The patterns of holes are oriented lying precisely on one another, as a result of which a connection of the connecting element 121 to the two profile elements 101' and 102', for example, with the rivets 129 illustrated in FIG. 3 is then made possible. The rivets can be inserted in a very simple manner, for example, by means of a "storage battery-operated rivet gun". The fact that the rack division 105' and 105" is continued at a uniform spacing from one profile to the next is achieved by the distance between the perforations in the side walls being aligned with the individual perforations 107' and 107" of the rack division 105' and 105" and, in addition, being spaced analogously. The connection of two profile elements that is illustrated in FIG. 3 is furthermore described in detail in WO 2009/034 010, the content of which is hereby included as part of the present invention. The profile elements 101' and 101" are plugged together by means of pins 133.

Figure 4:
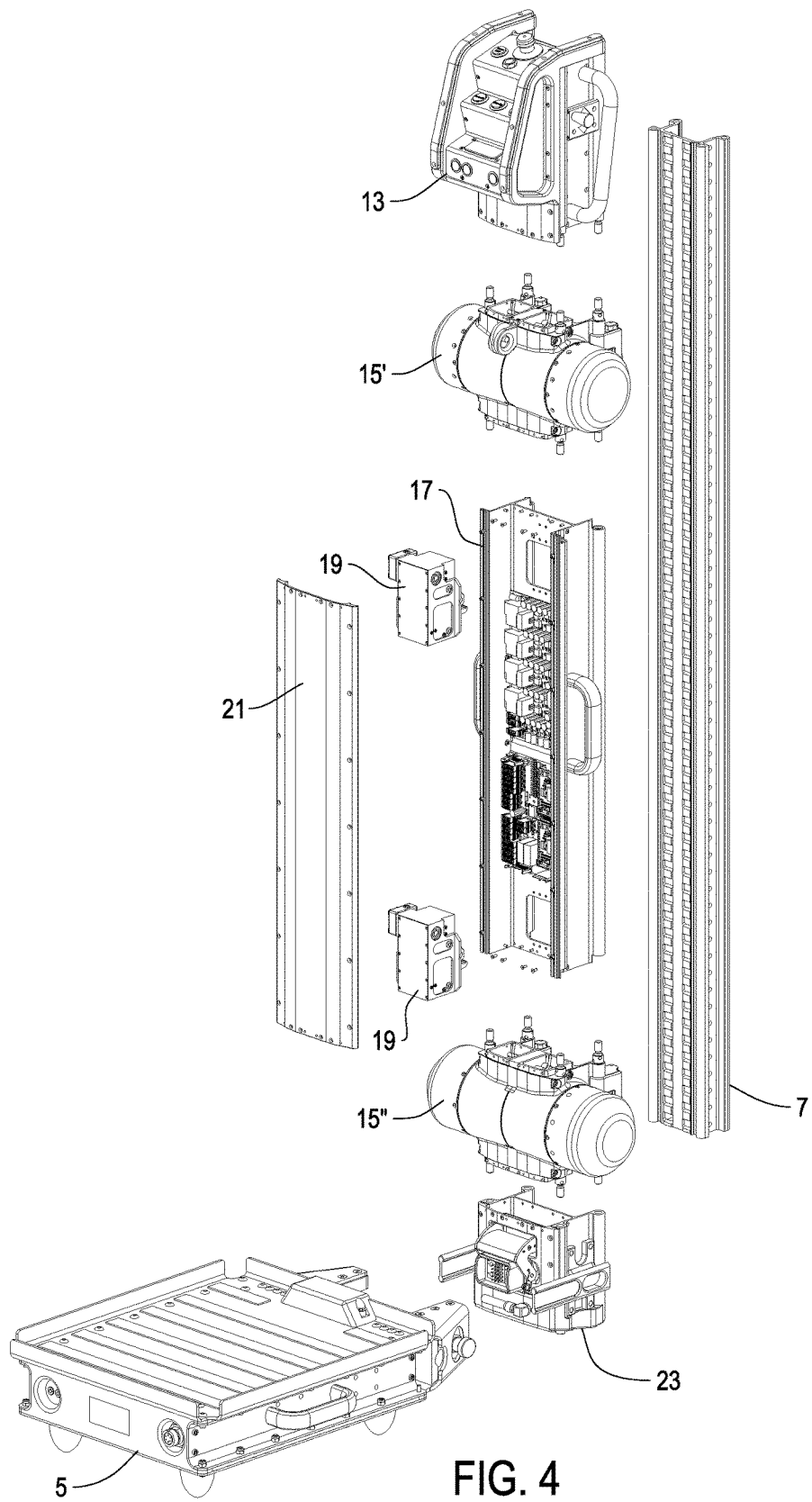
FIG. 4 shows the lift element according to the invention dismantled into the most important component parts, including a detail of the rail-like profile.

FIG. 4 schematically illustrates the individual parts of the lift element and part of the longitudinally extended, rail-like profile 7. The driving part 3 has, for example, two motor units 15' and 15" which serve to move the lift element upward and downward along the rail-like profile 7. The motor unit is discussed separately in more detail in FIG. 5.

A head part 13 which has, inter alia, handles, operating elements, displays and speed sensors, etc., is provided at the upper end of the driving part. Said head part is discussed in more detail in FIG. 9. Various elements required for operating the driving part, such as safety relay, controller, radio, emergency stopping members, etc., are arranged in an electronic housing 17 with a cover 21. FIG. 4 schematically illustrates two emergency stopping members 19, the function of which is discussed in more detail in turn with respect to FIG. 8. A platform support 23, on which the platform 5 can be fixedly mounted, for example, by means of a mechanical or electric coupling, is provided at the lower end of the driving part. A holder for a battery or a storage battery, and also corresponding electronic charging means are provided in the platform 5, which has a standing area for a person.

Figure 5:
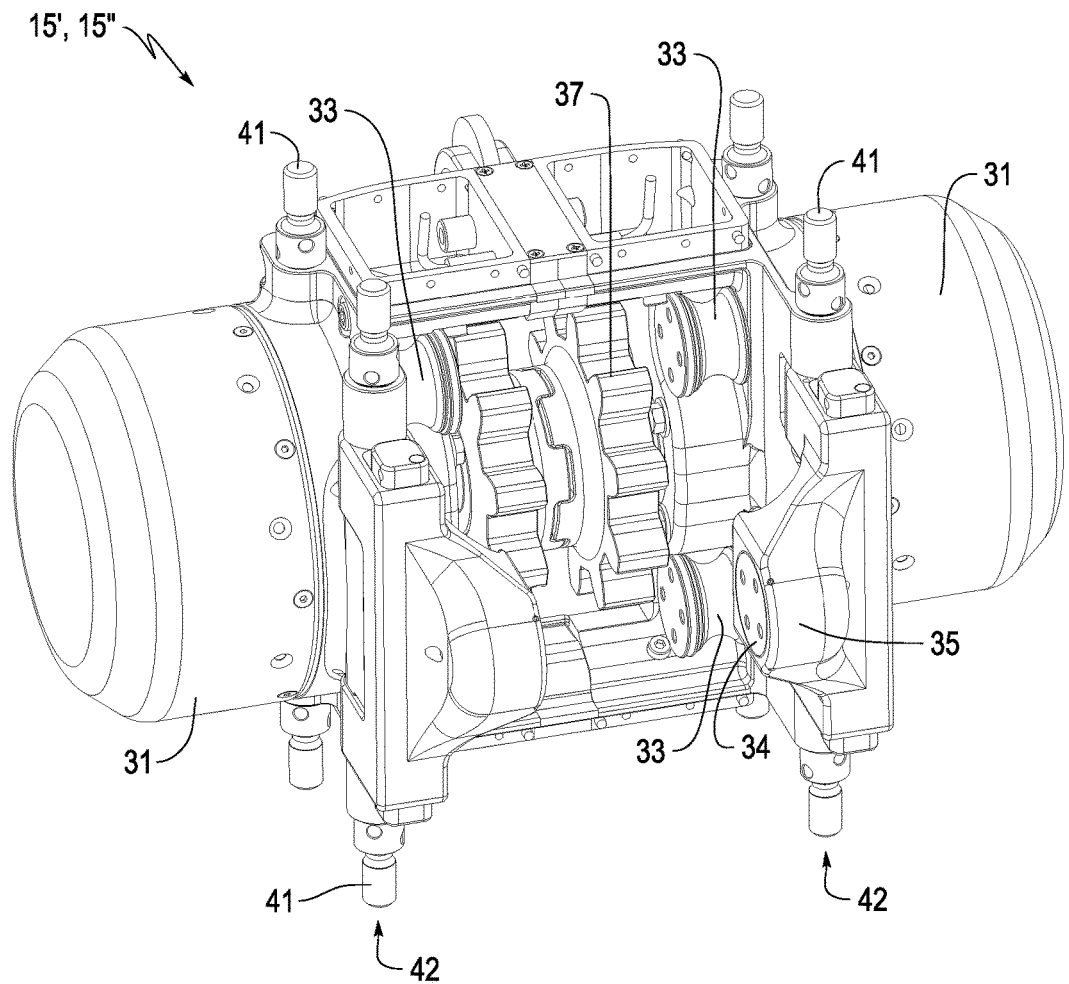
FIG. 5 shows the driving motor schematically in a perspective of the lift element according to the invention.

FIG. 5 illustrates, schematically in perspective, a driving motor 15' or 15", as seen in a view from the rail-like profile. Gearwheels 37 which can be connected, for example, to an integrated claw coupling are provided for the drive. The gearwheels 37 are driven by means of a driving motor which is laterally covered in each case by driving covers 31. Running rollers 33 and 34 are provided for guiding the driving part or the lift element, wherein the running rollers 34 can each be pivoted about pivoting axes 42, for example when the driving part is fixedly arranged on the rail-like profile or guide member. Cam-like pins 41 are provided for connecting the driving motor to the main housing or the electronic housing or for the connecting or the platform.

Figure 6:
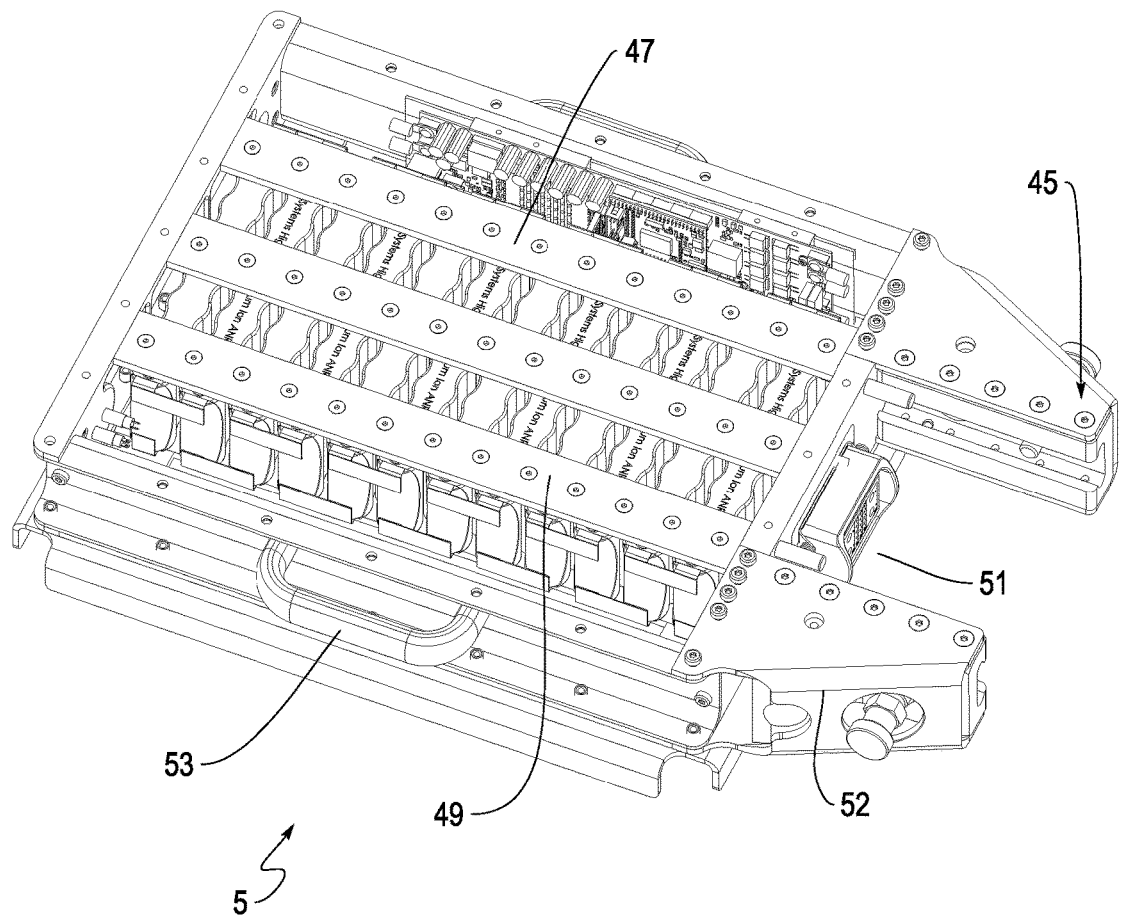
FIG. 6 shows the platform of the lift element in a perspective view.

FIG. 6 shows the platform 5 illustrated from the lower side, for example with a transparent covering, thus enabling a storage battery cell 49 arranged in the platform 5, for example lithium iron phosphate storage battery cells, to be visible. An electronic charging means is denoted laterally schematically by the reference number 47, wherein, at the same time, a main switch can be provided in order to interrupt the power supply of the driving part. An electronic connection 51 to the driving part is provided on the front side of the platform 5, and a limb 52, in which a mechanical lock 45 can be arranged, is provided laterally in each case for the fastening to the driving part.

The advantage of this releasability of the platform 5 from the driving part resides in the fact that the storage battery can be removed at any time for charging together with the platform and can easily be transported, for example, by means of the handle 53. The separation of the platform from the driving part also enables the entire lift element to be able to be transported substantially more simply, since two easily portable elements are therefore provided, whereas the entire lift element would be rather difficult to transport manually. The separability of the platform also makes it possible to be able to use different storage batteries, in particular if one storage battery is defective or if a new generation of storage batteries is intended to be used.

It is now schematically illustrated with reference to FIG. 7 how the lift element according to the invention is intended to be fixedly positioned on the rail-like profile 7. The entire operation is illustrated schematically with reference to figures a to d.

FIG. 7a shows the driving part 3, as seen from above, i.e. the head part 13 with the operating element and the laterally protruding covers 31 of the driving motor are visible. The driving part 3 is intended now to be arranged fixedly on the rail-like profile 7, in which a connecting element 121 is likewise visible, as are four longitudinal tubes 115 arranged in the corners of the profile. The profile 7 for its part, is arranged fixedly on a high-voltage tower 6 via fastening member 9. For the fixed arrangement of the driving part 3, two guide rollers 34 which are pivoted away laterally and engage laterally around the rail-like profile upon installation are provided.

First of all, as illustrated in figure b, the driving part is guided towards the rail-like profile 7 until the two longitudinal tubes 115, which are located closer to the driving part, engage in the two running rollers 33. Upon pressing against the rail-like profile 7, the two running rollers 34 which are further away and engage around the two outer longitudinal tubes 115, are automatically pivoted inward, as illustrated in figure c, in order to connect the driving part fixedly to the profile. At the same time as the inward movement, the rollers 34 are automatically latched, thus making it impossible to remove the driving part from the profile 7.

If the driving part 3 is now arranged fixedly on the profile 7, the platform 5 can also be connected to the driving part 3, which is illustrated schematically in the two figures c and d. It is also provided during the arrangement of the platform 5 that the mechanical lock 45, which is described with respect to FIG. 6, automatically latches, thus making it impossible to remove the platform 5. In the illustration according to FIG. 7d, the lift element is fixedly connected to the profile 7, and therefore, for example, an engineer can now climb a high-voltage tower.

FIGS. 8 (*a* and *b*) illustrates an important safety element which guarantees that an uncontrolled movement of the driving part on the rail-like profile is impossible. In particular, it is intended to be made impossible for the lift element to be moved downward in an uncontrolled manner and to be able to overshoot the upper or the lower end of the rail-like profile, likewise in an uncontrolled manner.

Figure 8A:
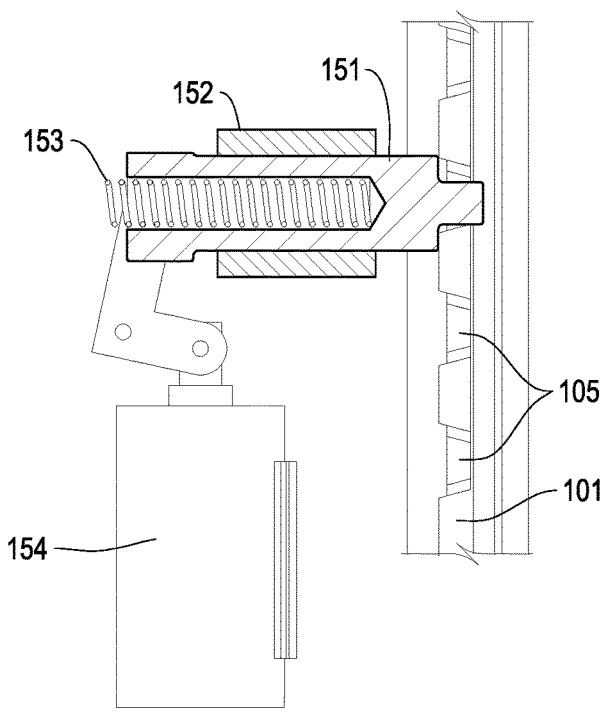
FIGS. 8*a* and 8*b* show, schematically in section, the manner of operation of an emergency stopping member of the lift element.

FIG. 8a shows the pawl 151 in the rest state, freely movable in a mounting 152 and latched by the spring 153 into the grid structure 105 of the rail 101. As a result, the driving part 3 is fixedly connected to the rail 101—the lift cannot move. In the event of an emergency, the power supply to the pawl drive (magnet) 154 is interrupted and the spring 153 automatically pushes the pawl 151 into the grid structure 105 of the rail 101.

Figure 8B:
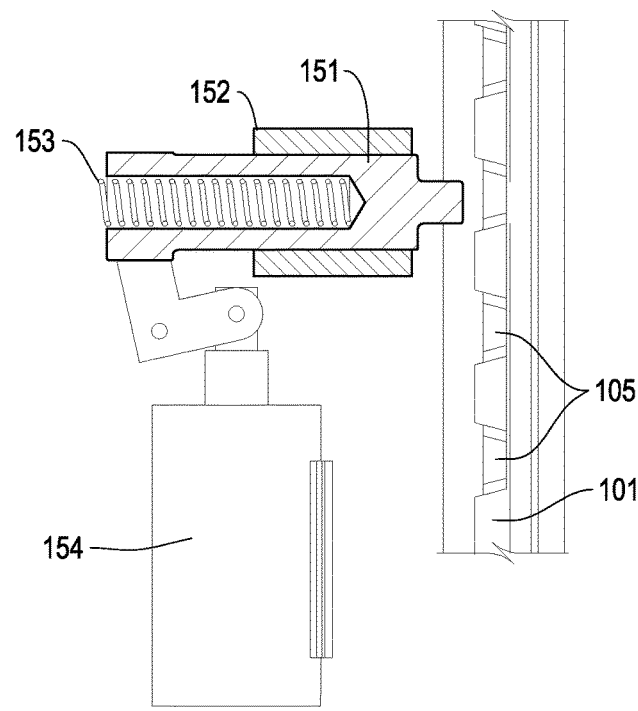

FIG. 8b shows a drive with energized magnet 154, tensioned spring 153 and retracted/tensioned pawl 151. During normal and undisturbed travel of the lift, the pawl 151 is tensioned in said rear position and the lift can move freely.

Figure 9:
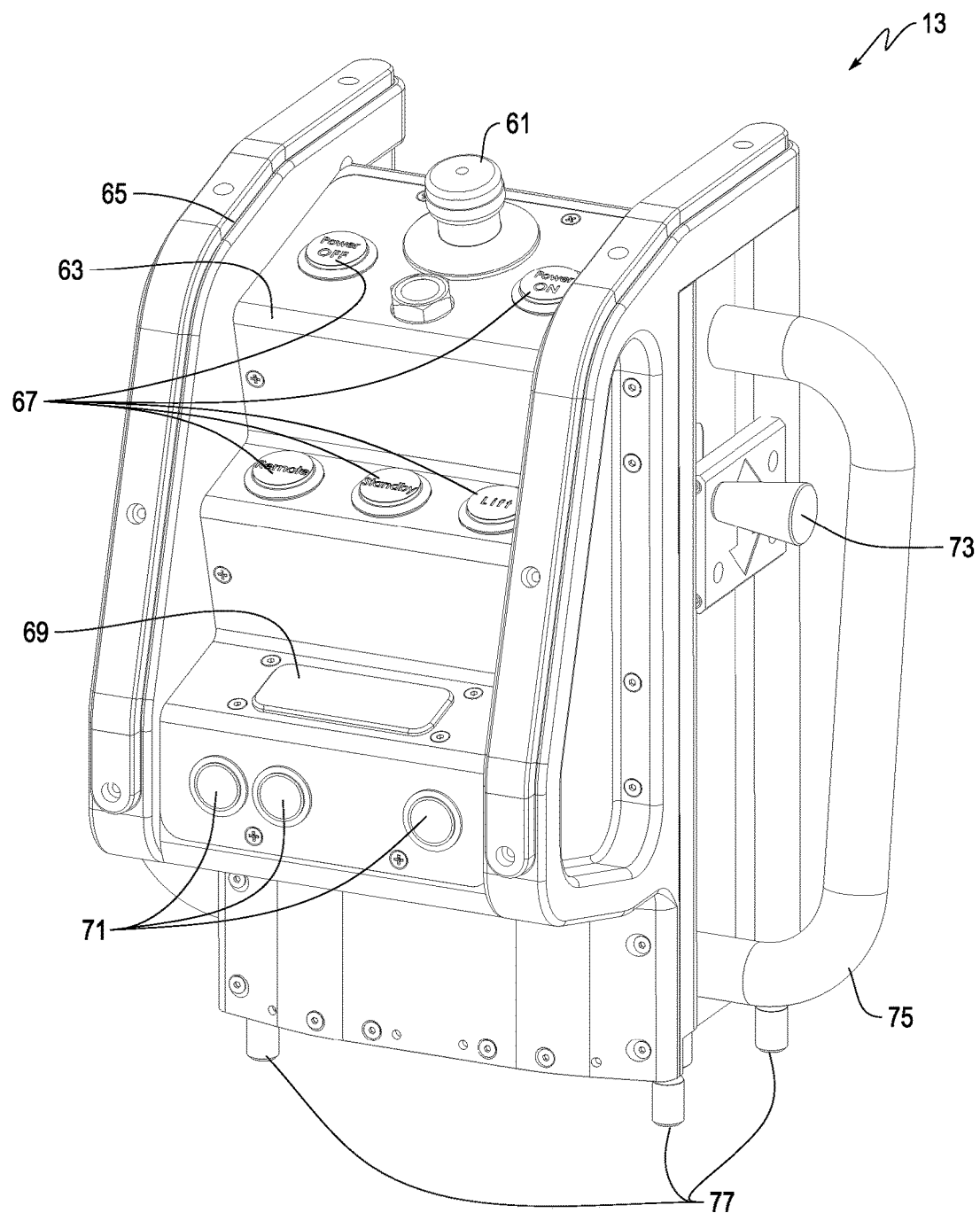
FIG. 9 shows an operating console of the lift element schematically in perspective, FIGS. 10*a* to 10*c* schematically show the mobile units of the lift element.

FIG. 9 shows the head part 13 according to FIG. 4 in detail with the various members and elements arranged thereon. An emergency push button switch 61 is provided at the top in the center and can be used to trigger an emergency braking of the driving part or lift element. It is also possible to see, for example, an ultrasonic sensor 63 for remote operation. The head part 13 has laterally a protective panel 625, on which handles 75 are provided laterally so that a person in the lift can hold thereon. A rocker push button switch 73 for downhill or uphill travel is likewise provided laterally. Of course said rocker push button switch can be arranged laterally on the left and/or right.

Further operating elements 67 are provided for the operation of the lift element.

Various operating and operationally-relevant data, which are settable by means of further operating elements 71, can be displayed on a display 69. Various menus can also be selected with said operating elements 71 in order to display a very wide variety of information on the display 69.

Finally, connecting pins 77 are provided for connecting the head part or the head console 13 to the driving housing.

Figure 10A:
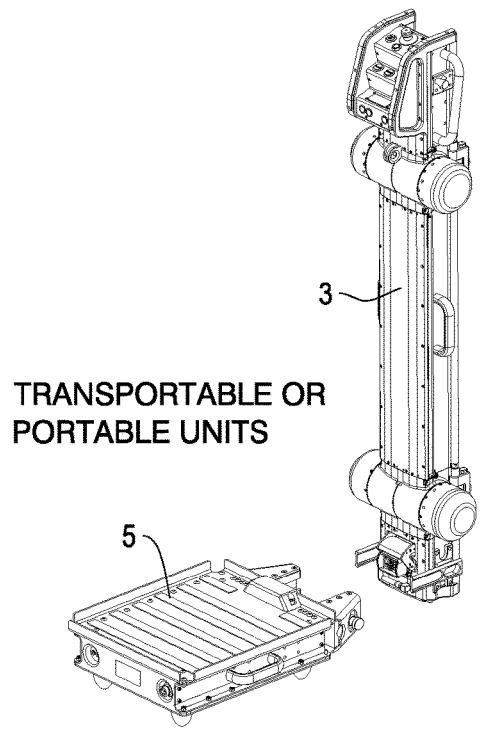
Figure 10B:
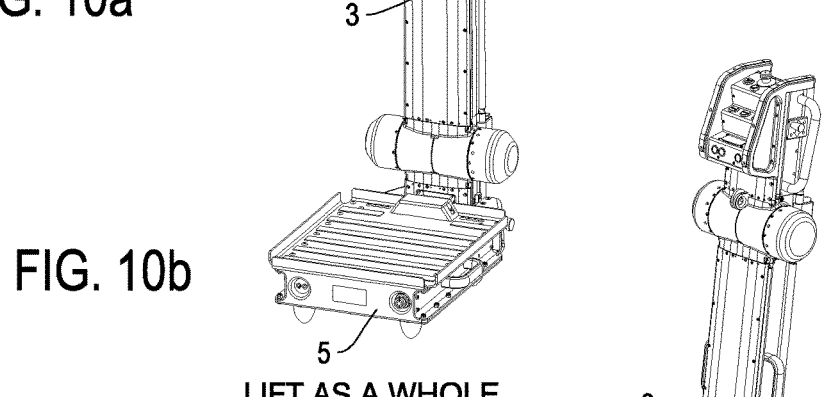
Figure 10C:
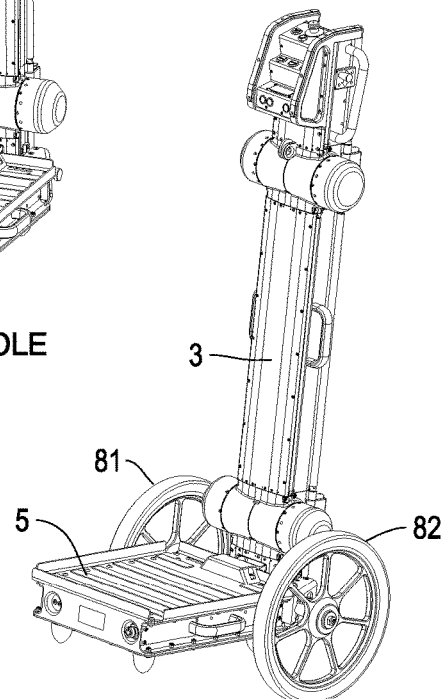

FIG. 10 shows once again schematically the various parts of the lift element, wherein, in FIG. 10*a*, the driving part 3 and the platform 5 are separated from each other for the transportation. For the operation, the platform 5 and the driving part 3 are connected to each other, and, according to FIG. 10*c*, it is furthermore possible to arrange clip-on wheels laterally, for the transportation of the lift element, if the platform and the driving part are not intended to be separated.

Figure 11:
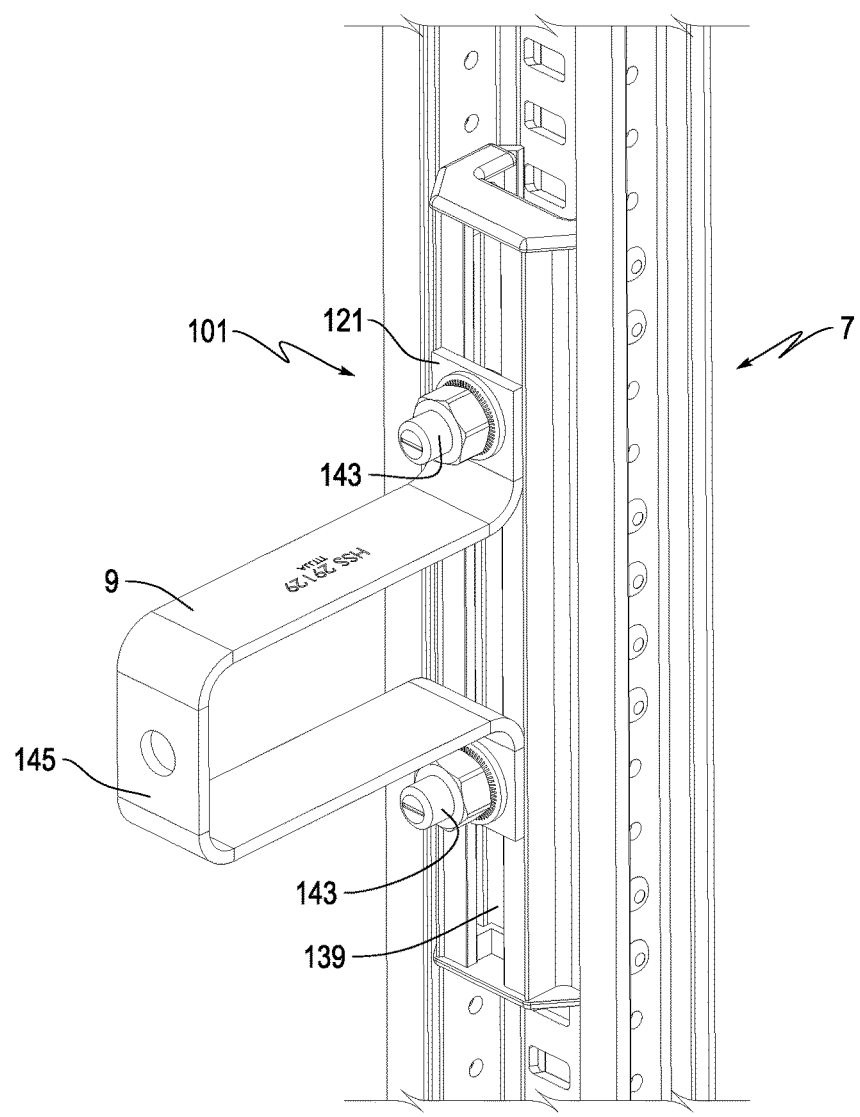
FIG. 11 shows, schematically and in perspective, a fastening element for fastening the rail-like profile to a tower.

FIG. 11 illustrates how the rail-like profile 7 can be fastened, for example, to a high-voltage tower by means of the fastening member 9. As is known, in the region of two profile parts 101 butting against each other, the rail-like profile 7 has a connecting element 121 on which the fastening member can now be fixedly arranged by means of screw connections 143. On the side opposite the profile, the fastening member 9 has a hole-like opening 145, by means of which the profile can be fitted to the high-voltage tower in turn by means of, for example, a screw connection.

Figure 12:
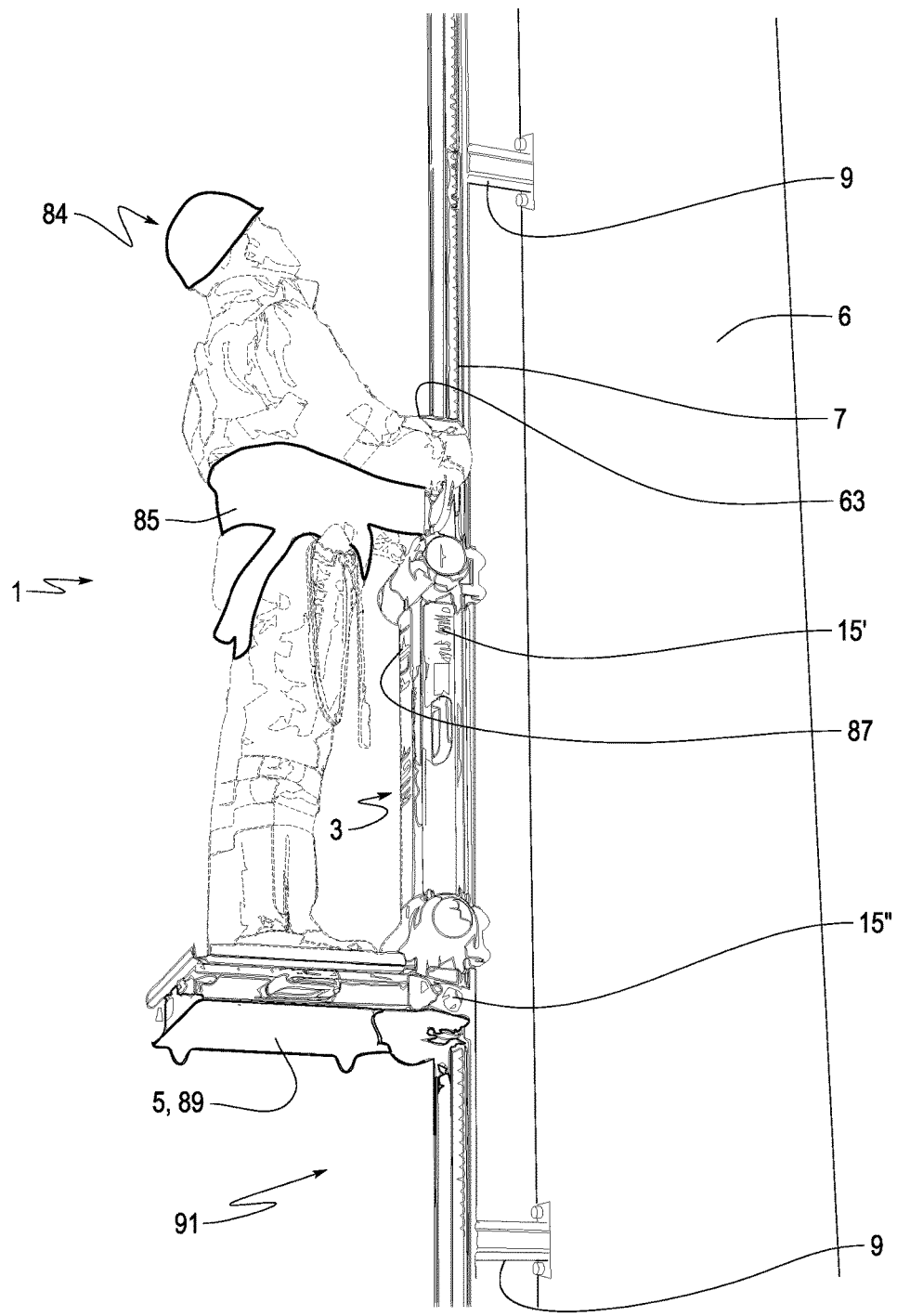
FIG. 12 shows the illustration of a person climbing up a tower along the rail-like profile by means of the lift element according to the invention.

FIG. 12 finally shows, with reference to a basic view, how a person 2 can climb a high-voltage tower or a tower of a wind installation, or can descend therefrom again, along the rail-like profile 7 by means of the lift element 1 according to the invention. The lift element 1 according to the invention, consisting of the driving part 3 and the platform 5, is used by a person 2 in order to move up a high-voltage tower 6 along the rail-like profile. It is essential here for the person to wear, for example, a helmet 84 and to be secured by means of a strap 85, wherein the buckling-up of the strap can be ensured, for example, by a monitoring means 87. The operation of the lift element is preferably coupled to said monitoring sensor in such a manner that the lift can be operated only when a person is buckled up. Further monitoring elements can be provided in order to ensure overloading of the platform is indicated by means of a load sensor 89, in order to monitor the operation by means of a speed sensor 91 arranged, for example, in the region of the platform, etc.

The elements, profile parts and parts of the lift element etc., which are illustrated with reference to FIGS. 1 to 12, merely constitute examples for better explanation of the present invention. Of course, the design can be adapted to the particular requirements, and the lift element illustrated according to the invention can be supplemented by further components. The configuration of the rail-like profile can also differ; the U-shaped configuration merely constitutes one example. Instead of the rail-like profile which is mentioned and is described in the figures, guide members configured in another manner are also conceivable for the upward and downward movement of the lift element described. For example, a stand-like guide member or single- or multi-part rod-like guide members, on which the lift element can be fastened and moved, is/are conceivable. However, guide cables arranged fixedly on, for example, high-voltage towers may optionally also be suitable for the re-releasable attachment of the lift element described according to the invention.

It is advantageous that the lift element can be at least in two parts, consisting of a driving part and a platform which is releasable connectable re to the driving part. The lift element is intended to be independent, portable and mobile and to be brought from use location to use location (a plurality of fixedly installed rails). With regard to the portability, reference should be made to the respective legal regulations defining appropriate specifications, such as, for example, a weight of a maximum of 30 kg. The mobility is further assisted by the lift element being manufactured in a lightweight construction, for example, by using lightweight construction materials, such as aluminum, aluminum alloys, fiber-reinforced composite materials, etc. It is also desirable for the drive to be fed by a storage battery or a fuel accumulator which is arranged on the lift element itself in order to guarantee complete autonomy of the lift element from the rail-like profile or guide member. Finally, it should be mentioned that the operation of the lift element can also take place by wireless remote control, that is to say, the drive can be operable by remote control.

The invention claimed is:

1. An arrangement for overcoming vertical distances of a structure, the arrangement comprising:
   at least one profile extending in a longitudinal direction comprising at least two fixedly mounted attachable or connectable profile elements,
   at least one autonomous lift element which is releasably fastenable to the profile, the at least one autonomous lift element including
      a protection member configured with a strap to secure at least one person on a platform,
      a driving part comprising a drive, wherein the driving part is adapted to move the autonomous lift element up and down along the profile and securing members which laterally engage around the profile, respectively, wherein the securing members are pivotable around pivoting axes extending substantially in parallel to the longitudinal direction, and
      the platform extending horizontally and configured to receive the at least one person, the platform being detachable from the driving part, and further comprising:
         a battery arranged in the platform and configured to supply power to the driving part only when the platform is connected to the driving part, and
      wherein the profile is configured to remain fixedly mounted to the structure after the autonomous lift element is detached and removed from the profile.

2. The arrangement according to claim 1, wherein the battery is removably arranged in the platform.

3. The arrangement according to claim 1,
   wherein the at least one autonomous lift element is at least partially manufactured for mobility and portability, from at least one material selected from the group consisting of aluminum, an aluminum alloy, and a fiber-reinforced composite material.

4. The arrangement according to claim 1,
   wherein the profile has a design selected from the group consisting of U-shaped, V-shaped, and at least approximately rectilinearly in a form of a band, wherein the securing members that laterally engage around the profile, as seen in the longitudinal direction, are provided on the driving part, and said securing members being latchable into a fixing position in order to ensure secure holding of the driving part on the profile.

5. The arrangement according to claim 4, wherein the securing members are lockable or foldable inward, and engage laterally behind the profile, when the driving part is placed against the profile.

6. The arrangement according to claim 1, further comprising
at least one gearwheel provided on the driving part for a transmission of force from the drive to perforations or openings, which are in a form of a rack in the longitudinal direction, in the profile.

7. The arrangement according to claim 1, further comprising an emergency stopping member provided on the driving part, said emergency stopping member being operatively connected to a sensor for sensing at least one of position, motion and speed in such a manner that an emergency stop is triggered automatically in a case of a malfunction in operating conditions of the arrangement.

8. The arrangement according to claim 1, wherein each of the at least two profile elements have a rack division running in the longitudinal direction,
wherein there are uniformly spaced pattern perforations in at least one wall of each profile element, said pattern perforations correspond to the rack division, and wherein every two profile elements are connected to a connecting element,
wherein the connecting element has at least one further wall that bears against the walls of the two profile elements, with further pattern perforations which run longitudinally and are congruent to the pattern perforations in the walls of each profile element,
wherein the pattern perforations in the walls of the connecting element and the profile elements are spaced in a corresponding manner so as to be congruent to each other, and
wherein connecting members are provided in order to connect the profile elements and the connecting element fixedly to one another via the pattern perforations.

9. The arrangement according to claim 1, further comprising a detector for detecting an operationally secure arrangement of the protection member in order to block an operation of the lift element should the protection member not be in the operationally secure arrangement.

10. The arrangement according to claim 1, wherein the battery is arranged in the platform so as to be removable in such a manner that interchanging the platform also permits an energy accumulator to be changed, or the energy accumulator can be recharged away from the driving part.

11. The arrangement according to claim 1, wherein the driving part or the lift element is operable by wireless remote control.

12. A method for climbing high towers using the arrangement of claim 1, comprising:
fastening the longitudinally extended profile to a tower,
arranging the autonomous lift element on the profile by latching the securing members behind the profile,
loading the platform of the autonomous lift element with at least one person or a load, and
activating the drive by an energy accumulator to move the at least one person or load upward on the tower along the profile.

13. The method according to claim 12, wherein after upward movement of the autonomous lift element is finished and following movement downward, removing the autonomous lift element from the profile for climbing a further tower, and leaving the profile fixedly mounted to the tower.

* * * * *